| (12) | United States Patent | (10) Patent No.: | US 9,300,106 B2 |
|---|---|---|---|
| | Armbruster et al. | (45) Date of Patent: | Mar. 29, 2016 |

(54) LASER DEVICE WITH A LASER UNIT AND A FLUID CONTAINER FOR A COOLING MEANS OF SAID LASER

(75) Inventors: Kevin L. Armbruster, Chicopee, MA (US); Brad D. Gilmartin, Gardner, MA (US); Peter J. Kueckendahl, Bad Oldesloe (DE); Bernard J. Richard, Dudley, MA (US); Daniel J. Ryan, Sycamore, IL (US)

(73) Assignee: Alltec Angewandte Laserlicht Technologie GmbH, Selmsdorf (DE)

( * ) Notice: Subject to any disclaimer, the term of this patent is extended or adjusted under 35 U.S.C. 154(b) by 0 days.

(21) Appl. No.: 14/342,487

(22) PCT Filed: Jul. 19, 2012

(86) PCT No.: PCT/EP2012/003063
§ 371 (c)(1),
(2), (4) Date: Mar. 3, 2014

(87) PCT Pub. No.: WO2013/034208
PCT Pub. Date: Mar. 14, 2013

(65) Prior Publication Data
US 2014/0226687 A1 Aug. 14, 2014

(30) Foreign Application Priority Data

Sep. 5, 2011 (EP) .................................... 11007179

(51) Int. Cl.
*H01S 3/04* (2006.01)
*F01P 5/00* (2006.01)
(Continued)

(52) U.S. Cl.
CPC .................. *H01S 3/0407* (2013.01); *F01P 5/00* (2013.01); *F01P 3/2285* (2013.01); *F01P 5/10* (2013.01); *F01P 11/029* (2013.01); *F01P 2003/001* (2013.01)

(58) Field of Classification Search
CPC .............. H05K 7/20827; H05K 7/203; H05K 7/20809; H05K 7/20781; F25D 2331/805; F25D 31/007; F25D 11/02; F25D 11/022; F25D 15/00; F25D 17/02; F25D 17/065; F25D 2331/803; A61K 8/046; A61K 8/89; A61K 8/891; A61K 8/898; A61K 8/0216; A61Q 5/02; A61Q 5/12; A23V 2002/00; G01N 35/00732; B65D 43/16; F01P 3/00; F01P 3/2285; F01P 5/10; F01P 11/029; F01P 2003/001; F01P 2007/143
USPC ................................................. 372/34, 35, 36
See application file for complete search history.

(56) References Cited

U.S. PATENT DOCUMENTS

| 2,359,780 | A | * | 10/1944 | Muffly ...................... F25B 5/02 |
|---|---|---|---|---|
| | | | | 137/624.14 |
| 3,465,358 | A | | 9/1969 | Bridges |

(Continued)

FOREIGN PATENT DOCUMENTS

| DE | 4029187 A1 | 3/1992 |
|---|---|---|
| DE | 4212390 A1 | 10/1993 |

(Continued)

OTHER PUBLICATIONS

International Application No. PCT/EP2012/003073, Preliminary Report on Patentability, Sep. 26, 2013, 14 pages.

(Continued)

*Primary Examiner* — Xinning Niu
*Assistant Examiner* — Vu A Vu
(74) *Attorney, Agent, or Firm* — Hoffman Warnick LLC

(57) ABSTRACT

The invention relates to a laser device (10) comprising at least one laser unit (20) for generating laser light, and cooling means (30) for cooling said laser unit, said cooling means including a channel arrangement (35) through which a cooling fluid is circulated for transferring heat away from the laser unit. The laser device is characterized in that a mounting member (46) for releasably holding a fluid container (50) is provided, the mounting member comprises a first connector element (42) for connecting to a second connector element (44) of the fluid container in a fluid tight manner, and the mounting member is connected with the channel arrangement. The invention further relates to a fluid container for cooling fluid for use in the laser device. The fluid container is designed as a cartridge (50) and comprises an information storage means (60) for storing information about the container and the cooling fluid filled in said fluid container.

14 Claims, 4 Drawing Sheets

(51) Int. Cl.
*F01P 5/10* (2006.01)
*F01P 3/22* (2006.01)
*F01P 3/00* (2006.01)
*F01P 11/02* (2006.01)

(56) References Cited

U.S. PATENT DOCUMENTS

| | | | |
|---|---|---|---|
| 3,533,012 A | 10/1970 | Johnson et al. |
| 3,564,449 A | 2/1971 | Muller et al. |
| 3,564,452 A | 2/1971 | Rempel |
| 3,596,202 A | 7/1971 | Patel |
| 3,602,837 A | 8/1971 | Goldsborough |
| 3,609,584 A | 9/1971 | Stitch et al. |
| 3,628,175 A | 12/1971 | Rigden |
| 3,638,137 A | 1/1972 | Krupke |
| 3,646,476 A | 2/1972 | Barker et al. |
| 3,705,999 A | 12/1972 | Hermann et al. |
| 3,721,915 A | 3/1973 | Reilly |
| 3,801,929 A | 4/1974 | Kawasaki |
| 3,851,272 A | 11/1974 | Shull et al. |
| 3,900,804 A | 8/1975 | Davis et al. |
| 3,919,663 A | 11/1975 | Caruolo et al. |
| 3,946,233 A | 3/1976 | Erben et al. |
| 4,053,851 A | 10/1977 | Krupke |
| 4,122,853 A | 10/1978 | Smith |
| 4,125,755 A | 11/1978 | Plamquist |
| 4,131,782 A | 12/1978 | Einstein et al. |
| 4,189,687 A | 2/1980 | Wieder et al. |
| 4,270,845 A | 6/1981 | Takizawa et al. |
| 4,376,496 A * | 3/1983 | Sedam et al. ................. 222/83.5 |
| 4,467,334 A | 8/1984 | Anzai |
| 4,477,907 A | 10/1984 | McMahan |
| 4,500,996 A | 2/1985 | Sasnett et al. |
| 4,500,998 A | 2/1985 | Kuwabara et al. |
| 4,512,639 A | 4/1985 | Roberts et al. |
| 4,554,666 A | 11/1985 | Altman |
| 4,596,018 A | 6/1986 | Gruber et al. |
| 4,614,913 A | 9/1986 | Honeycutt et al. |
| 4,652,722 A | 3/1987 | Stone et al. |
| 4,655,547 A | 4/1987 | Heritage et al. |
| 4,660,209 A | 4/1987 | Osada et al. |
| 4,665,607 A | 5/1987 | Ressencourt |
| 4,672,620 A | 6/1987 | Slusher et al. |
| 4,689,467 A | 8/1987 | Inoue |
| 4,720,618 A | 1/1988 | Stamer et al. |
| 4,727,235 A | 2/1988 | Stamer et al. |
| 4,744,090 A | 5/1988 | Freiberg |
| 4,770,482 A | 9/1988 | Sweeney et al. |
| 4,779,278 A | 10/1988 | McKinney |
| 4,819,246 A | 4/1989 | Aiello et al. |
| 4,831,333 A | 5/1989 | Welch |
| 4,845,716 A | 7/1989 | Poehler et al. |
| 4,846,550 A | 7/1989 | Schuma et al. |
| 4,856,007 A | 8/1989 | Weiss |
| 4,858,240 A | 8/1989 | Pohler et al. |
| 4,907,240 A | 3/1990 | Klingel |
| 4,912,718 A | 3/1990 | Klingel |
| 4,953,176 A | 8/1990 | Ekstrand |
| 4,958,900 A | 9/1990 | Ortiz, Jr. |
| 4,991,149 A | 2/1991 | Maccabee |
| 5,001,718 A | 3/1991 | Burrows et al. |
| 5,012,259 A | 4/1991 | Hattori et al. |
| 5,023,886 A | 6/1991 | Hobart et al. |
| 5,052,017 A | 9/1991 | Hobart et al. |
| 5,065,405 A | 11/1991 | Laakmann et al. |
| 5,097,481 A | 3/1992 | Fritzsche et al. |
| 5,109,149 A | 4/1992 | Leung |
| 5,115,446 A | 5/1992 | Von Borstel et al. |
| 5,162,940 A | 11/1992 | Brandelik |
| 5,199,042 A | 3/1993 | Papetti et al. |
| 5,214,658 A | 5/1993 | Ostler |
| 5,229,573 A | 7/1993 | Stone et al. |
| 5,229,574 A | 7/1993 | Stone |
| 5,268,921 A | 12/1993 | McLellan |
| 5,274,661 A | 12/1993 | von Gunten et al. |
| 5,294,774 A | 3/1994 | Stone |
| 5,337,325 A | 8/1994 | Hwang |
| 5,339,737 A | 8/1994 | Lewis et al. |
| 5,386,427 A | 1/1995 | Zayhowski |
| 5,386,431 A | 1/1995 | Tulip |
| 5,422,906 A | 6/1995 | Karasaki et al. |
| 5,426,659 A | 6/1995 | Sugiyama et al. |
| 5,431,199 A * | 7/1995 | Benjay et al. ................. 141/59 |
| 5,504,763 A | 4/1996 | Bischel et al. |
| 5,506,858 A | 4/1996 | Takenaka et al. |
| 5,544,186 A | 8/1996 | Sauer et al. |
| 5,550,853 A | 8/1996 | Ostler |
| 5,568,306 A | 10/1996 | Mandel |
| 5,572,538 A * | 11/1996 | Saitoh et al. ................. 372/34 |
| 5,592,504 A | 1/1997 | Cameron |
| 5,596,594 A | 1/1997 | Egawa |
| RE35,446 E | 2/1997 | Stone |
| 5,608,754 A | 3/1997 | Murakami et al. |
| 5,646,907 A | 7/1997 | Maccabee |
| 5,653,900 A | 8/1997 | Clement et al. |
| 5,659,561 A | 8/1997 | Torruellas et al. |
| 5,670,064 A | 9/1997 | Nakata |
| 5,682,262 A | 10/1997 | Wefers et al. |
| 5,689,363 A | 11/1997 | Dane et al. |
| 5,706,305 A | 1/1998 | Yamane et al. |
| 5,720,894 A | 2/1998 | Neev et al. |
| 5,729,568 A | 3/1998 | Opower et al. |
| 5,767,477 A | 6/1998 | Sutter, Jr. |
| 5,808,268 A | 9/1998 | Balz et al. |
| 5,815,523 A | 9/1998 | Morris |
| 5,837,962 A | 11/1998 | Overbeck |
| 5,864,430 A | 1/1999 | Dickey et al. |
| 5,884,588 A * | 3/1999 | Ap ........................ F01P 11/20 123/41.14 |
| 5,929,337 A | 7/1999 | Collins et al. |
| 5,982,803 A | 11/1999 | Sukhman et al. |
| 6,050,486 A | 4/2000 | French et al. |
| 6,057,871 A | 5/2000 | Peterson |
| 6,064,034 A | 5/2000 | Rieck |
| 6,069,843 A | 5/2000 | DiMarzio et al. |
| 6,122,562 A | 9/2000 | Kinney et al. |
| 6,141,030 A | 10/2000 | Fujita et al. |
| 6,180,913 B1 | 1/2001 | Kolmeder et al. |
| 6,181,728 B1 | 1/2001 | Cordingley et al. |
| 6,192,061 B1 | 2/2001 | Hart et al. |
| 6,210,401 B1 | 4/2001 | Lai |
| 6,229,940 B1 | 5/2001 | Rice et al. |
| 6,256,121 B1 | 7/2001 | Lizotte et al. |
| 6,263,007 B1 | 7/2001 | Tang |
| 6,269,111 B1 | 7/2001 | Mori et al. |
| 6,303,930 B1 | 10/2001 | Hagiwara |
| 6,310,701 B1 | 10/2001 | Lizotte |
| 6,313,957 B1 | 11/2001 | Heemstra et al. |
| 6,341,042 B1 | 1/2002 | Matsunaka et al. |
| 6,356,575 B1 | 3/2002 | Fukumoto |
| 6,370,884 B1 | 4/2002 | Kelada |
| 6,420,675 B1 | 7/2002 | Lizotte et al. |
| 6,421,159 B1 | 7/2002 | Sutter et al. |
| 6,476,350 B1 | 11/2002 | Grandjean et al. |
| 6,495,795 B2 | 12/2002 | Gortler et al. |
| 6,512,781 B1 | 1/2003 | Von Borstel et al. |
| 6,539,045 B1 | 3/2003 | Von Borstel et al. |
| 6,621,838 B2 * | 9/2003 | Naito et al. ................. 372/34 |
| 6,661,568 B2 | 12/2003 | Hollemann et al. |
| 6,690,702 B1 | 2/2004 | Ohmi et al. |
| 6,693,930 B1 | 2/2004 | Chuang et al. |
| 6,768,765 B1 | 7/2004 | Schroeder et al. |
| 6,791,592 B2 | 9/2004 | Assa et al. |
| 6,829,000 B2 | 12/2004 | Assa et al. |
| 6,856,509 B2 * | 2/2005 | Lin ........................ 361/679.02 |
| 6,861,614 B1 | 3/2005 | Tanabe et al. |
| 6,898,216 B1 | 5/2005 | Kleinschmidt |
| 6,915,654 B2 * | 7/2005 | Johnson ........................ 62/259.4 |
| 6,944,201 B2 | 9/2005 | Bunting et al. |
| 7,046,267 B2 | 5/2006 | Franklin et al. |
| 7,058,100 B2 * | 6/2006 | Vetrovec et al. ................. 372/34 |
| 7,167,194 B2 | 1/2007 | Assa et al. |
| 7,170,251 B2 | 1/2007 | Huang |
| 7,190,144 B2 | 3/2007 | Huang |

(56) References Cited

U.S. PATENT DOCUMENTS

| | | | |
|---|---|---|---|
| 7,200,464 B2 | 4/2007 | Nussbaum et al. | |
| 7,291,999 B2 | 11/2007 | Huang | |
| 7,331,512 B2 | 2/2008 | Caiger | |
| 7,334,744 B1* | 2/2008 | Dawson | A01G 13/065 239/200 |
| 7,346,427 B2* | 3/2008 | Hillam et al. | 700/236 |
| 7,394,479 B2 | 7/2008 | Assa et al. | |
| 7,421,308 B2 | 9/2008 | Nussbaum et al. | |
| 7,496,831 B2 | 2/2009 | Dutta et al. | |
| 7,521,649 B2 | 4/2009 | Umetsu et al. | |
| 7,521,651 B2 | 4/2009 | Gross et al. | |
| 7,543,912 B2* | 6/2009 | Anderson et al. | 347/49 |
| 7,565,705 B2* | 7/2009 | Elkins et al. | 2/458 |
| 8,164,025 B1 | 4/2012 | Kunas et al. | |
| 8,168,921 B1 | 5/2012 | Kunas et al. | |
| 8,212,178 B1 | 7/2012 | Kunas et al. | |
| 8,263,898 B2 | 9/2012 | Alber | |
| 2001/0030983 A1 | 10/2001 | Yuri et al. | |
| 2001/0045418 A1 | 11/2001 | Brandinger et al. | |
| 2002/0021730 A1 | 2/2002 | Schroeder et al. | |
| 2002/0071466 A1 | 6/2002 | Zeller | |
| 2002/0080845 A1 | 6/2002 | Schulz et al. | |
| 2002/0114362 A1 | 8/2002 | Vogler et al. | |
| 2002/0162825 A1 | 11/2002 | Lizotte et al. | |
| 2002/0196534 A1 | 12/2002 | Lizotte et al. | |
| 2003/0010420 A1 | 1/2003 | Morrow | |
| 2003/0014895 A1 | 1/2003 | Lizotte | |
| 2003/0019854 A1 | 1/2003 | Gross et al. | |
| 2003/0123040 A1 | 7/2003 | Almogy | |
| 2003/0147443 A1 | 8/2003 | Backus | |
| 2003/0168434 A1 | 9/2003 | Gross et al. | |
| 2003/0174741 A1 | 9/2003 | Weingarten et al. | |
| 2003/0219056 A1 | 11/2003 | Yager et al. | |
| 2003/0219094 A1 | 11/2003 | Basting et al. | |
| 2004/0021054 A1 | 2/2004 | Bennett | |
| 2004/0027630 A1 | 2/2004 | Lizotte | |
| 2004/0028108 A1 | 2/2004 | Govorkov et al. | |
| 2004/0066825 A1 | 4/2004 | Hayashikawa et al. | |
| 2004/0119979 A1 | 6/2004 | Duarte et al. | |
| 2004/0179570 A1 | 9/2004 | Vitruk et al. | |
| 2004/0202220 A1 | 10/2004 | Hua et al. | |
| 2004/0228004 A1 | 11/2004 | Sercel et al. | |
| 2004/0232125 A1 | 11/2004 | Clauer et al. | |
| 2005/0013328 A1 | 1/2005 | Jurgensen | |
| 2005/0056626 A1 | 3/2005 | Gross et al. | |
| 2005/0059265 A1 | 3/2005 | Im | |
| 2005/0068538 A1 | 3/2005 | Rao et al. | |
| 2005/0092722 A1 | 5/2005 | Dane et al. | |
| 2005/0094684 A1 | 5/2005 | Hermann et al. | |
| 2005/0094697 A1 | 5/2005 | Armier et al. | |
| 2005/0107773 A1 | 5/2005 | Bergt et al. | |
| 2005/0111496 A1 | 5/2005 | Reeder et al. | |
| 2005/0111500 A1 | 5/2005 | Harter et al. | |
| 2005/0111514 A1 | 5/2005 | Matsumoto et al. | |
| 2005/0157762 A1 | 7/2005 | DeMaria et al. | |
| 2005/0190809 A1 | 9/2005 | Peterson et al. | |
| 2005/0202611 A1 | 9/2005 | Mitsuhashi et al. | |
| 2005/0205778 A1 | 9/2005 | Kitai et al. | |
| 2005/0220164 A1 | 10/2005 | Mori et al. | |
| 2005/0226286 A1 | 10/2005 | Liu et al. | |
| 2005/0226287 A1 | 10/2005 | Shah et al. | |
| 2006/0044981 A1 | 3/2006 | Egawa et al. | |
| 2006/0061854 A1 | 3/2006 | Dane et al. | |
| 2006/0092522 A1 | 5/2006 | Lizotte | |
| 2006/0092995 A1 | 5/2006 | Frankel et al. | |
| 2006/0114947 A1 | 6/2006 | Morita | |
| 2006/0114956 A1 | 6/2006 | Sandstrom et al. | |
| 2006/0161381 A1 | 7/2006 | Jetter | |
| 2006/0191063 A1* | 8/2006 | Elkins et al. | 2/458 |
| 2006/0227841 A1 | 10/2006 | Savich | |
| 2006/0245084 A1 | 11/2006 | Brustle et al. | |
| 2006/0249491 A1 | 11/2006 | Jurgensen | |
| 2006/0266742 A1 | 11/2006 | Hall et al. | |
| 2006/0287697 A1* | 12/2006 | Lennox | A61F 7/0085 607/96 |
| 2007/0029289 A1 | 2/2007 | Brown | |
| 2007/0030875 A1 | 2/2007 | Takazane et al. | |
| 2007/0086493 A1 | 4/2007 | Apolonski et al. | |
| 2007/0098024 A1 | 5/2007 | Mitchell | |
| 2007/0138151 A1 | 6/2007 | Tanaka et al. | |
| 2007/0177260 A1 | 8/2007 | Kuppenheimer et al. | |
| 2007/0205186 A1 | 9/2007 | Kitai et al. | |
| 2007/0235458 A1* | 10/2007 | Hewkin | F01P 11/029 220/612 |
| 2007/0247499 A1* | 10/2007 | Anderson et al. | 347/86 |
| 2007/0295974 A1 | 12/2007 | Fontanella et al. | |
| 2008/0042042 A1 | 2/2008 | King et al. | |
| 2008/0043799 A1 | 2/2008 | Egawa et al. | |
| 2008/0094636 A1 | 4/2008 | Jin et al. | |
| 2008/0253415 A1 | 10/2008 | Livingston | |
| 2008/0253417 A1 | 10/2008 | Livingston | |
| 2008/0279247 A1 | 11/2008 | Scholz et al. | |
| 2008/0297912 A1 | 12/2008 | Baldwin | |
| 2009/0010285 A1 | 1/2009 | Dubois et al. | |
| 2009/0027753 A1 | 1/2009 | Lizotte | |
| 2009/0185176 A1 | 7/2009 | Livingston et al. | |
| 2009/0185590 A1 | 7/2009 | Livingston | |
| 2009/0188901 A1 | 7/2009 | Dantus | |
| 2009/0207478 A1 | 8/2009 | Oron et al. | |
| 2009/0245318 A1 | 10/2009 | Clifford, Jr. | |
| 2009/0312676 A1* | 12/2009 | Rousso | A61F 7/10 601/15 |
| 2009/0323739 A1 | 12/2009 | Elliott et al. | |
| 2009/0323753 A1 | 12/2009 | Gmeiner et al. | |
| 2010/0132817 A1* | 6/2010 | Hewkin | B01D 35/027 137/544 |
| 2010/0206882 A1* | 8/2010 | Wessels | F01P 11/029 220/562 |
| 2010/0220750 A1 | 9/2010 | Brownell | |
| 2010/0254415 A1 | 10/2010 | Oh et al. | |
| 2011/0032602 A1 | 2/2011 | Rothenberg | |
| 2011/0032603 A1 | 2/2011 | Rothenberg | |
| 2011/0032604 A1 | 2/2011 | Rothenberg et al. | |
| 2011/0043899 A1 | 2/2011 | Erlandson | |
| 2011/0097906 A1 | 4/2011 | Kwon et al. | |
| 2011/0102537 A1 | 5/2011 | Griffin et al. | |
| 2011/0127241 A1 | 6/2011 | Rumsby | |
| 2011/0127697 A1 | 6/2011 | Milne | |
| 2011/0128500 A1 | 6/2011 | Bille | |
| 2011/0227972 A1* | 9/2011 | Taniguchi et al. | 347/7 |
| 2011/0253690 A1 | 10/2011 | Dane et al. | |
| 2011/0255088 A1 | 10/2011 | Dane et al. | |
| 2011/0259631 A1 | 10/2011 | Rumsby | |
| 2011/0266264 A1 | 11/2011 | Rumsby | |
| 2011/0286480 A1 | 11/2011 | Bayramian | |
| 2012/0106083 A1* | 5/2012 | Toftloekke | F28D 15/0266 361/698 |
| 2014/0204713 A1 | 7/2014 | Armbruster et al. | |
| 2014/0224778 A1 | 8/2014 | Armbruster et al. | |

FOREIGN PATENT DOCUMENTS

| | | |
|---|---|---|
| DE | 10125447 A1 | 1/2002 |
| EP | 0157546 A2 | 10/1985 |
| EP | 0427229 A3 | 5/1991 |
| EP | 1184946 A1 | 3/2002 |
| EP | 2565673 A1 | 3/2012 |
| GB | 1495477 A | 12/1977 |
| GB | 2211019 A | 6/1989 |
| GB | 2249843 A | 5/1992 |
| GB | 2304641 A | 3/1997 |
| JP | 63094695 A | 4/1988 |
| JP | 5129678 A | 5/1993 |
| JP | 2001276986 A | 10/2001 |
| JP | 2007032869 A | 2/2007 |
| JP | 2007212118 A | 8/2007 |
| JP | 2011156574 A | 8/2011 |
| WO | 0046891 A1 | 8/2000 |
| WO | 0107865 A2 | 2/2001 |
| WO | 0243197 A2 | 5/2002 |

OTHER PUBLICATIONS

International Application No. PCT/EP2012/003072, Preliminary Report on Patentability, Mar. 12, 2014, 7 pages.

(56) References Cited

OTHER PUBLICATIONS

International Application No. PCT/EP2012/003071, Preliminary Report on Patentability, Mar. 12, 2014, 5 pages.
International Application No. PCT/EP2012/003070, Preliminary Report on Patentability, Mar. 12, 2014, 7 pages.
International Application No. PCT/EP2012/003069, Preliminary Report on Patentability, Nov. 27, 2013, 32 pages.
International Application No. PCT/EP2012/003068, Preliminary Report on Patentability, Mar. 12, 2014, 5 pages.
International Application No. PCT/EP2012/003067, Preliminary Report on Patentability, Nov. 28, 2013, 19 pages.
International Application No. PCT/EP2012/003066, Preliminary Report on Patentability, Nov. 28, 2013, 19 pages.
International Application No. PCT/EP2012/003065, Preliminary Report on Patentability, Nov. 28, 2013, 21 pages.
International Application No. PCT/EP2012/003064, Preliminary Report on Patentability, Nov. 15, 2013, 18 pages.
International Application No. PCT/EP2012/003063, Preliminary Report on Patentability, Mar. 12, 2014, 5 pages.
International Application No. PCT/EP2012/003062, Preliminary Report on Patentability, Mar. 12, 2014, 6 pages.
International Application No. PCT/EP2012/003061, Preliminary Report on Patentability, Mar. 12, 2014, 6 pages.
International Application No. PCT/EP2012/003073, Search Report and Written Opinion, Dec. 18, 2012, 8 pages.
International Application No. PCT/EP2012/003072, Search Report and Written Opinion, Oct. 8, 2012, 11 pages.
International Application No. PCT/EP2012/003071, Search Report and Written Opinion, Nov. 15, 2012, 9 pages.
International Application No. PCT/EP2012/003070, Search Report and Written Opinion, Oct. 8, 2012, 11 pages.
International Application No. PCT/EP2012/003069, Search Report and Written Opinion, Sep. 27, 2012, 8 pages.
International Application No. PCT/EP2012/003068, Search Report and Written Opinion, Nov. 15, 2012, 8 pages.
International Application No. PCT/EP2012/003067, Search Report and Written Opinion, Nov. 16, 2012, 7 pages.
International Application No. PCT/EP2012/003066, Search Report and Written Opinion, Nov. 15, 2012, 7 pages.
International Application No. PCT/EP2012/003065, Search Report and Written Opinion, Nov. 16, 2012, 7 pages.
International Application No. PCT/EP2012/003064, Search Report and Written Opinion, Nov. 16, 2012, 7 pages.
International Application No. PCT/EP2012/003063, Search Report and Written Opinion, Nov. 15, 2012, 9 pages.
International Application No. PCT/EP2012/003062, Search Report and Written Opinion, Nov. 15, 2012, 10 pages.
International Application No. PCT/EP2012/003061, Search Report and Written Opinion, Sep. 10, 2012, 9 pages.
U.S. Appl. No. 14/342,508, Final Office Action dated Dec. 10, 2014, 23 pages.
U.S. Appl. No. 14/342,510, Office Action dated Aug. 1, 2014.
U.S. Appl. No. 14/342,508, Office Action dated Aug. 14, 2014.
U.S. Appl. No. 14/342,503, Office Action dated Aug. 21, 2014.
U.S. Appl. No. 14/342,487, Office Action dated Aug. 14, 2014.
U.S. Appl. No. 14/342,483, Office Action dated Oct. 2, 2014.
U.S. Appl. No. 14/342,503, Final Office Action dated Dec. 18, 2014, 22 pages.
U.S. Appl. No. 14/342,493, Office Action dated Nov. 19, 2014.
Notice of Allowance and Fee(s) Due for U.S. Appl. No. 14/342,510, dated Feb. 20, 2015, 20 pages.
Notice of Allowance and Fee(s) Due for U.S. Appl. No. 14/342,503, dated Mar. 17, 2015, 11 pages.
Notice of Allowance and Fee(s) Due for U.S. Appl. No. 14/342,508, dated Apr. 1, 2015, 15 pages.
Notice of Allowance and Fee(s) Due for U.S. Appl. No. 14/342,483, dated Apr. 2, 2015, 26 pages.
Final Office Action for U.S. Appl. No. 14/342,493, dated Apr. 21, 2015, 25 pages.
Notice of Allowance and Fee(s) Due for U.S. Appl. No. 14/342,493, dated Jun. 24, 2015, 11 pages.
Office Action for U.S. Appl. No. 14/342,494, dated Oct. 2, 2015, 47 pages.
Office Action for U.S. Appl. No. 14/342,481, dated Oct. 6, 2015, 77 pages.
Office Action for U.S. Appl. No. 14/342,477, dated Oct. 7, 2015, 74 pages.
Office Action for U.S. Appl. No. 14/342,495, dated Oct. 6, 2015, 77 pages.
Office Action for U.S. Appl. No. 14/342,499, dated Oct. 6, 2015, 77 pages.

* cited by examiner

LASER DEVICE WITH A LASER UNIT AND A FLUID CONTAINER FOR A COOLING MEANS OF SAID LASER

FIELD OF THE INVENTION

The present invention relates to a laser device.

The invention further relates to a fluid container for cooling fluid for use in the laser device.

The laser device comprises at least one laser unit for generating laser light, and cooling means for cooling said laser unit, said cooling means including a channel arrangement through which a cooling fluid is circulated for transferring heat away from the laser unit.

RELATED ART

It is known to have a cooling device for laser units, in particular for gas lasers, in order to transfer the heat away which is generated by the gas discharge in resonator tubes of the gas lasers. For achieving a high laser beam quality it is necessary to keep the temperature of the laser unit within a defined range. Common cooling means comprises a pump for passing a cooling fluid through pipes, tubes and other channels in the heat generating components of the laser device.

Even in closed cooling circuits a certain loss of coolant caused by evaporation, leakage or diffusion occurs.

Therefore, it is necessary to regularly check the level of coolant fluid in the system and refill fluid. In known devices, the fluid is refilled from a bottle via an opening at the housing of the device. However, if wrong fluid or older, contaminated fluid is filled into the system this may result in corrosion, blockages or insufficient heat transfer. This often leads to a reduced lifetime of the device.

SUMMARY OF THE INVENTION

It is an object of the invention to insure a reliable cooling of the laser device.

The object is solved according to the invention with a laser device. The object is further solved according to the invention with a fluid container. Other embodiments of the invention are given herein.

The laser device is characterized in that a mounting member for releasably holding a fluid container is provided, the mounting member comprises a first connector element for connecting to a second connector element of the fluid container in a fluid tight manner, and the mounting member is connected with the channel arrangement.

An idea of the invention is to provide a defined coolant supply for cooling means by a specific fluid container. The filling of wrong or inappropriate fluid is avoided. Further, connection lines between the cooling means and an external coolant reservoir are unnecessary since the inventive fluid container is directly connected at the filling portion of the system. The fluid container allows to compensate losses of coolant flow within the cooling means of the laser unit. The connector elements provide a fluid tight connection and support of the fluid container at the mounting member. The filling portion, i.e. the fluid container's outlet for coolant, provides a stable support between the fluid container and the channel arrangement. In some embodiments, the first connector element of the mounting member comprises a specific contour allowing connection only of one type of container with the correct cooling fluid.

Further, the risk of accidental spillage of coolant fluid during the filling operation is reduced. The spillage of fluid could cause serious damage to the electrical laser device. As a result, refilling becomes easier and more secure for the operator and the laser device.

In the sense of the invention, the terms "fluid", "cooling fluid", "coolant" and "coolant fluid" are interchangeable. That coolant can be transferred from the fluid container to the channel arrangement, or one channel of the channel arrangement, via the first and the second connector elements.

In an embodiment the first connector element comprises closure means, wherein a fluidic connection between the fluid container and the channel is closed when the fluid container is released. The closure means prevents leakage of coolant when the fluid container is released from the first connector element. The filling portion is closed automatically when the fluid container is released. This can be achieved for example by a first connector element designed as a valve closure or spring loaded closure plate. On the other hand, when the first connector element of the mounting member engages with the second connector element of the fluid container, the closure means is in an open state to let pass coolant.

The second connector element tightly fits with the first connector element of said mounting member. The connection between the connector elements may result in an improved attachment of the fluid container to the mounting member. The type of the connection can generally be of any kind. A plug connection or thread connection may be formed by the connector elements wherein the first connector element is a female connection at the mounting member, while the second connector element at the fluid container is designed as a male connection.

According to the invention said fluid container can be designed as a cartridge with a sealing at said second connector element. The sealing prevents leakage of fluid stored in the cartridge. The cartridge is transportable wherein its form and size is not fixed. Furtheron, the arrangement of the sealing at the cartridge ensures regular replacements. The cartridge can be filled with a defined amount of a fluid, avoiding overfilling of the cooling system. An intact sealing guarantees the defined amount of fresh fluid filled in the cartridge.

In an embodiment of the invention, said sealing is formed by a thin flexible plate of foil. Any intake or contamination of unwanted particles which could spoil the composition of the fluid inside the cartridge is avoided. The thin sealing will be broken by the first use, so that any reuse with old fluid can be easily recognized and avoided.

According to the invention it may be preferred that the mounting member comprises puncture means for puncturing said sealing of said fluid container. This has the advantage of automatically opening the sealing when the cartridge is connected to the mounting member. The puncture means may include a needle comprising a central passage through which the fluid can be transferred from the inside of the cartridge to the channel arrangement connected to said mounting member.

It may be preferred that at said fluid container information storing means, in particular a microchip, is arranged for storing information about said fluid container and said cooling fluid in said fluid container. The information may include relevant data about the stored fluid in the container, for example composition of fluid, date of production etc. Therefore one fluid container can be identified based on the information stored in said storing means. In addition a detector unit can be provided for detecting or receiving information. The information storing means are designed as a microchip or as a transponder chip. Data concerning the fluid can be saved on the microchip after filling the container with said fluid for a detailed documentation of the content of the fluid container.

The data saved in the information storing means may also comprise the amount of coolant contained in the fluid container.

For reading the information stored in the information storing means, it may be preferred that the mounting member comprises electrical contact surfaces. These contact electrical contact areas of the fluid container when the latter is held by the mounting member.

It may be preferred that a reader for reading the information on said information storage element and an evaluation unit are provided, which allows filling of said cooling fluid from said fluid container based on the read information.

Based on the read out information by the reader the evaluation unit of the device can identify the data on the storing means. Based on the received information the evaluation opens or keeps closed the closure means at the filling portion. This ensures that only suitable fluid from a correct container can be filled into the cooling system. As a result, wrong fluid is prevented from entering the channel arrangement of the cooling means. Furthermore, the evaluation unit can determine data concerning the fill level of the cooling fluid in the cooling means and/or the container. A signal unit could be activated by the evaluation unit, if the fluid level falls under a defined level in order to ensure an adequate coolant supply. The activated signal shows an operator to employ a new fluid container.

In another embodiment of the invention it may be preferred that in the channel arrangement at least one pump for circulation the cooling fluid in said channel arrangement is placed. The at least one pump has the function to circulate the cooling fluid within the channel arrangement to transfer the waste heat generated in the laser unit and to pass the warmed up cooling fluid to a heat exchange for cooling down the cooling fluid to the desired operation temperature. Furtheron, the cooling fluid from the cooling container can be sucked in the channel arrangement by the at least one pump as well, if a fluid container is connected to the filling portion of said channel arrangement.

The inventive fluid container is characterized in that the fluid container is designed as a cartridge and comprises an information storage element for storing information about the fluid container and the cooling fluid filled in said fluid container. The cartridge design enables a sufficient cooling fluid supply with a compact design which is easy to operate. Furthermore, the information storage element can comprise important information about the cooling fluid filled in said cartridge by which a good utilisation of the cooling fluid can be achieved with high operating reliability.

BRIEF DESCRIPTION OF THE DRAWINGS

The invention will now be further described with reference to preferred embodiments schematically shown in the attached figures, wherein.

In all figures identical components are identified by identical reference signs.

DETAILED DESCRIPTION OF THE INVENTION

Figure 1:
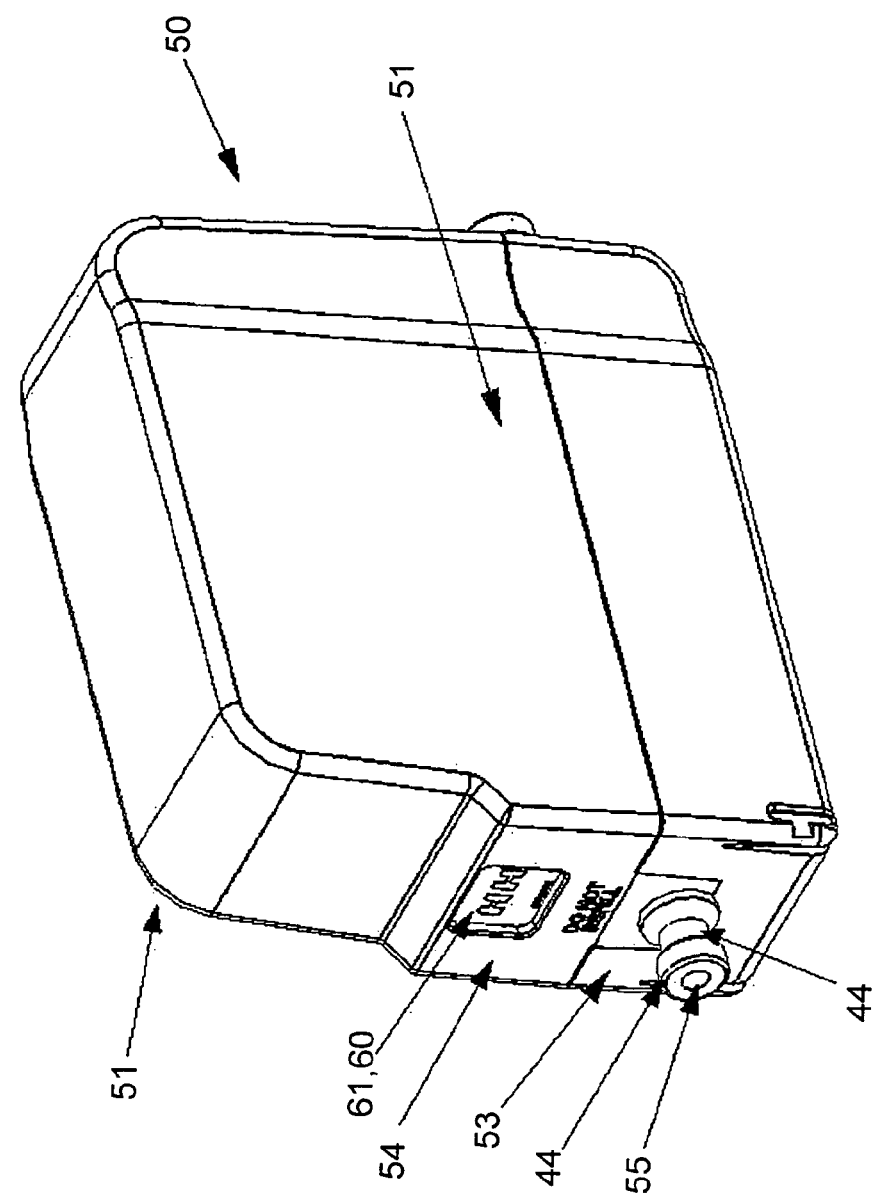
FIG. 1 shows a perspective view of an embodiment of a cartridge according to the invention.
Figure 2:
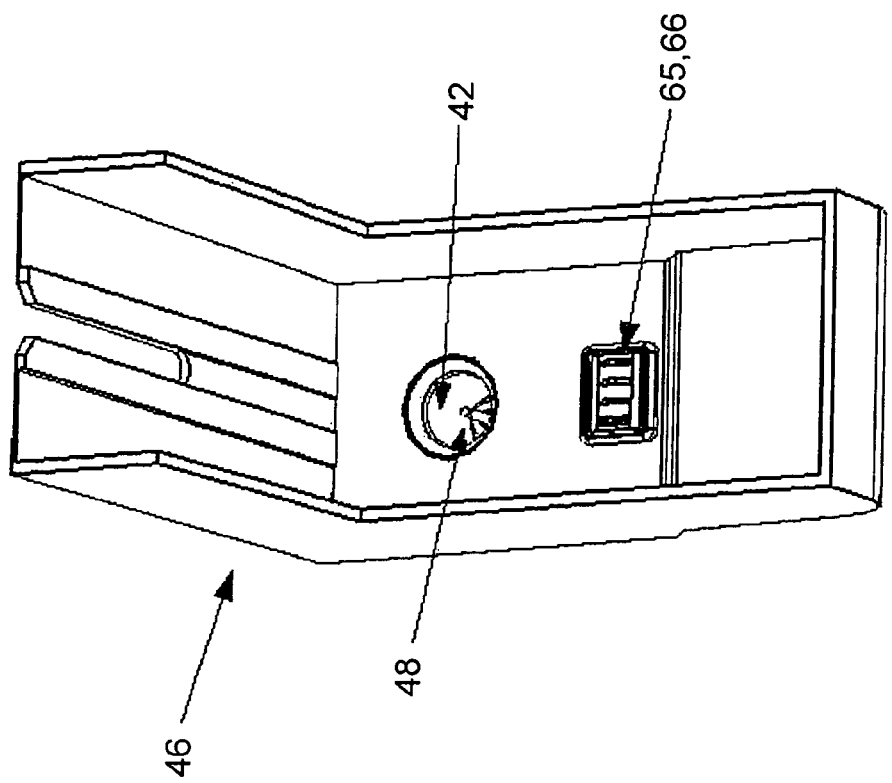
FIG. 2 shows a perspective view of an embodiment of a mounting member of an inventive laser device.

The invention will first be described with reference to FIGS. 1 and 2. In FIG. 1, a perspective view of a fluid container or cartridge 50 for accommodating a cooling fluid is depicted. FIG. 2 shows a mounting member 46 onto which the cartridge 50 can be mounted. The mounting member 46 serves for releasing the stored cooling fluid.

Referring to FIG. 1, the cartridge 50 consists of a rectangular shaped basic body 51 comprising a fluid reservoir which is filled with a cooling fluid for a cooling means. In the lower region of the cartridge front side 53 a bush-like connector element 44 is arranged. This connector element 44 is in the following referred to as the second connector element 44. It is adapted to be connected with another, preferably cylindrical, first connector element 42 of the mounting member 46, which is shown in FIG. 2. The second connector element 44, is designed as a female connection member. The discharge opening of the second connector element 44 is sealed by a sealing foil 55. The sealing foil 55 prevents leakage of the fluid out of the cartridge 50. An intact sealing foil 50 indicates that the cartridge 50 is unused. Furthermore the sealing foil 55 prevents evaporation of the cooling fluid stored inside the cartridge 50.

For using the cooling fluid stored in the cartridge 50 in order to provide cooling fluid for a cooling means 30 for a laser device, the cartridge 50 is connected by its second connector element 44 with the first connector element 42 wherein the first connector element 42 is designed as a male connection member which tightly fits in the second connector element 44 to form a positive connection. As shown in FIG. 2, puncture means 48 are arranged at the center of the first connector element 42 to puncture the sealing foil 55 to enable a flow of the stored cooling fluid between both connector elements 42, 44.

The first connector element 42 of the mounting member may also be designed for holding the cartridge 50, therefore no further fastening or mounting devices for holding the cartridge 50 at the first connector element 42 are required. The mounting member 46 prevents spillage of the cooling fluid while the cartridge 50 is connected by the connector elements 42, 44.

The mounting member 46 comprises a reader element 65 which can read out information stored in a microchip 60 attached on one side 54 of the basic body 51 of the cartridge 50. An electrical connection between the reader element 65 and the microchip 60 is established via electrical contact surfaces 66 of the mounting member 46 and electrical contact areas 61 of the cartridge 50. The microchip 60 contains information about the cooling fluid inside the cartridge 50 wherein the information is written in the memory when the cartridge 50 is filled with said cooling fluid.

While the cartridge 50 is connected by the connector elements 42, 44 the information stored in the microchip 60 is read out by the reader element 65 through a communication link formed by the electrical contact areas 61 of the cartridge 50 and the electrical contact surfaces 66 of the mounting member 46. Then, the read out information is transmitted from the reader element 65 to an evaluation unit (not depicted in FIGS. 1 and 2) which is arranged at the mounting member 46. The function of the evaluation unit is to assure whether or not the cooling fluid stored in the cartridge 50 is compatible with or suitable for the cooling means 30. If the transmitted information matches the data of the evaluation unit, the circulation pump 38 turns on and enables the cooling fluid to enter a channel arrangement 35 of the cooling means 30. In the case of mismatching of the transmitted data the circulation pump 38 stays off. Entering incorrect cooling fluid into the channel arrangement 35 is thus prevented whereby the cooling means 30 are protected.

Figure 3:
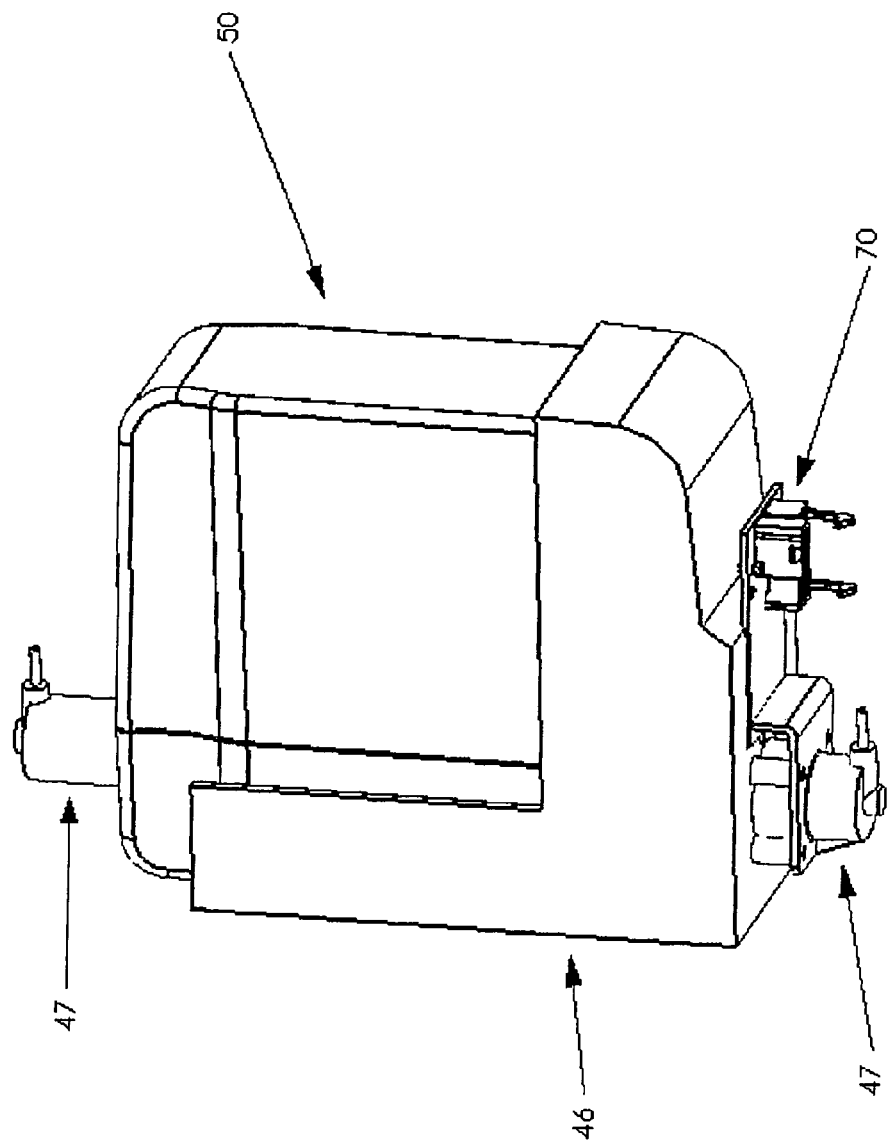
FIG. 3 shows a perspective view of the embodiment of a cartridge and a mounting member of a laser device according to the invention.

FIG. 3 depicts the cartridge 50 and the mounting member 46 which are connected to each other. Furthermore, the evaluation unit 70 is shown. One channel of the channel arrangement 35 for transporting the cooling fluid can be connected to the filling portion 46 via a fluid connector 47 of the filling portion 46. Likewise, the cartridge 50 may comprise a fluid connector 47 for connecting to a channel of the channel arrangement to establish a closed circulation circle.

Figure 4:
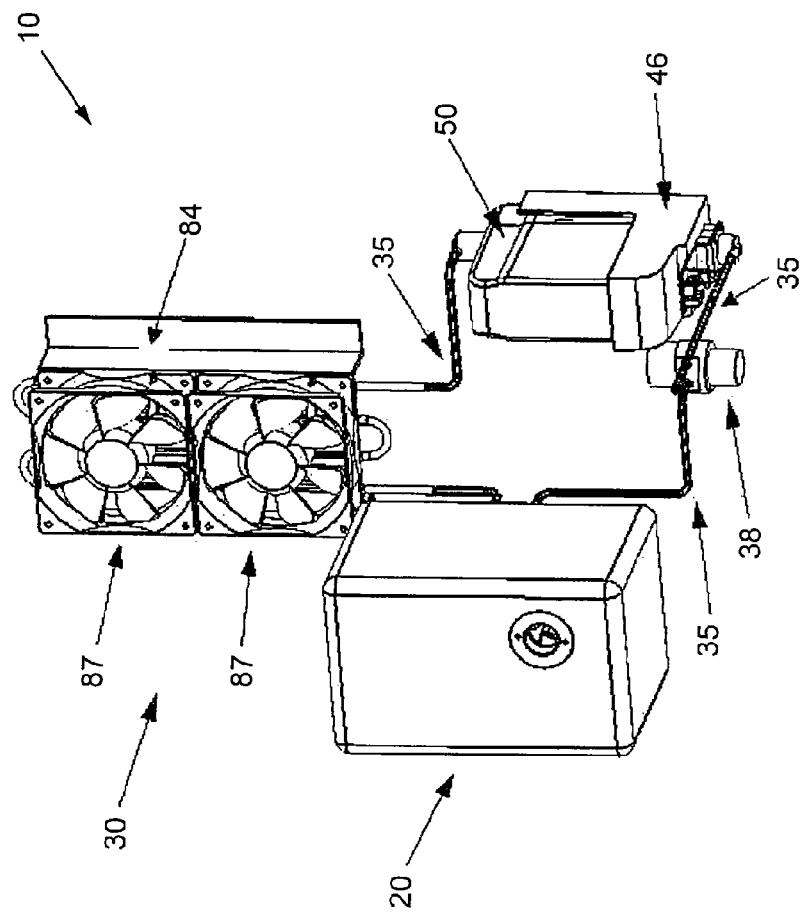
FIG. 4 shows a perspective view of an embodiment of a laser device according to the invention.

FIG. 4 shows a schematic perspective view of an embodiment of a laser device 10 according to the invention. The laser device 10 comprises a laser unit 20, the cooling means 30, the cartridge 50 and the mounting member 46 for holding the cartridge 50. The cooling means 30 comprise a channel arrangement 35 which is connected with the laser unit 20 and forms a closed loop. The cooling fluid is passed through the closed loop by a circulation pump 38. The channel arrangement 35 comprises a channel input which is connected to a filling portion of the cartridge 50 via the connector element of the mounting member 46. The channel input serves for compensating a fluid loss within the channel arrangement 35 caused for example by evaporation or diffusion by introducing fresh cooling fluid from the cartridge 50 via the mounting member 46 into the channel arrangement 35.

The cooling means 30 comprises a heat exchanger 84 which is attached to the laser unit 20. The waste heat of the laser unit 20 is absorbed by the cooling fluid, which is transferred within the channel arrangement 35. The heated cooling fluid is cooled down again by passing the heat exchanger 84. The heat exchanger 84 comprises at least one ventilator 87, in the depicted example there are two ventilators 87, for generating a flow of air. The heat exchanger 84 is connected to the laser unit 20 by means of the channel arrangement 35.

In one embodiment (not depicted) a closed loop is formed by the channel arrangement 35 together with the laser unit 20 and the heat exchanger 84. In this case, the fluid connector 47 of the filling portion 46 is connected to the channel arrangement at one generally arbitrary position. In the depicted embodiment, however, a closed loop is only formed together with the cartridge 50. That is, the cartridge 50 comprises a fluid connector 47 such that the cooling fluid flows through the cartridge 50 during regular operation.

The laser unit 20 houses one laser or a plurality of lasers for generating laser beams. The laser unit 20 exhibits an opening through which the laser beams can exit the laser unit 20.

The laser unit 20 may comprise an umbilical input to which an umbilical cable can be connected. The umbilical cable may comprise power lines, signal lines, and cooling lines for supplying the laser unit 20 with electrical power, control signals and cooling fluid.

The invention claimed is:

1. A laser device comprising:
at least one laser unit for generating laser light, and
cooling means for cooling said laser unit, said cooling means including a channel arrangement through which a cooling fluid is circulated for transferring heat away from the laser unit,
wherein:
a mounting member for releasably holding a fluid container is provided,
wherein the mounting member at least partially surrounds the fluid container for mechanically holding the fluid container,
the fluid container comprises a fluid connector for establishing a fluid connection with the fluid container and comprises another fluid connector for establishing a fluid connection with a pipe of the channel arrangement,
wherein the fluid connector and the another fluid connector establish a closed circuit of cooling fluid flow for the cooling fluid between the fluid container and the at least one laser unit,
the mounting member comprises a first connector element for connecting to a second connector element of the fluid container in a fluid tight manner,
the first connector element of the mounting member is thread-free and configured to hold the fluid container when pressed straight onto the mounting member, and the mounting member is connected with the channel arrangement,
wherein the mounting member is configured to completely disconnect the fluid container and reconnect a distinct fluid container.

2. The laser device according to claim 1, wherein the first connector element comprises closure means which are closed when the fluid container is released.

3. The laser device according to claim 1, wherein said fluid container is designed as a cartridge with a sealing at said second connector element.

4. The laser device according to claim 3, wherein said sealing is designed as a thin flexible plate or foil.

5. The laser device according to claim 3, wherein the mounting member comprises puncture means for puncturing said sealing of said fluid container.

6. The laser device according to claim 1, wherein at said fluid container an information storing means is arranged for storing information about said fluid container and said cooling fluid in said fluid container.

7. The laser device according claim 6, wherein for reading the information stored in the information storing means, the mounting member comprises electrical contact surfaces, the electrical contact surfaces being arranged such that they contact electrical contact areas of the fluid container when the fluid container is held by the mounting member.

8. The laser device according to claim 6, wherein a reader for reading the information on said information storing means and an evaluation unit are provided, which allows filling of said cooling fluid from said fluid container based on the read information.

9. The laser device according to claim 1, wherein in the channel arrangement at least one pump for circulating the cooling fluid in said channel arrangement is placed.

10. A fluid container for cooling fluid for use in the laser device according to claim 1, wherein the fluid container is designed as a cartridge and comprises an information storage means for storing information about the fluid container and the cooling fluid filled in said fluid container.

11. The laser device according to claim 1, wherein the distinct fluid container is connected to the mounting member subsequent to the complete removal of the fluid container.

12. The laser device according to claim 1, wherein the first connector element of the mounting member comprises a specific contour allowing connection only of one type of fluid container.

13. The laser device according to claim 2, wherein the closure means of the first connector element includes a valve closure or a spring loaded closure plate, wherein when the first connecter element of the mounting member engages with the second connector element of the fluid container or the distinct fluid container, the closure means is in an open state to let coolant pass there through.

14. The laser device according to claim 7, wherein the information about the fluid container includes data about a composition of the cooling fluid or a date of production of the cooling fluid.

* * * * *